(12) United States Patent
Shimamura et al.

(10) Patent No.: US 6,460,230 B2
(45) Date of Patent: Oct. 8, 2002

(54) MOLD-IN FASTENING MEMBER AND PRODUCTION OF MOLDED RESIN ARTICLE HAVING MOLD-IN FASTENING MEMBER

(75) Inventors: Kunihiko Shimamura, Okayama-ken; Hiroshi Itoh, Osaka; Tooru Tanokura, Osaka; Shiro Ogawa, Osaka, all of (JP)

(73) Assignee: Kuraray Co., Ltd., Kurashiki (JP)

( * ) Notice: Subject to any disclaimer, the term of this patent is extended or adjusted under 35 U.S.C. 154(b) by 0 days.

(21) Appl. No.: 09/750,770

(22) Filed: Jan. 2, 2001

(65) Prior Publication Data

US 2001/0007166 A1 Jul. 12, 2001

(30) Foreign Application Priority Data

Jan. 12, 2000 (JP) ........................................ 2000-003213

(51) Int. Cl.$^7$ ........................... A44B 21/00; B05D 1/02; B29C 45/00; B29C 33/16
(52) U.S. Cl. ........................... 24/452; 24/306; 24/442; 24/447
(58) Field of Search ........................... 24/306, 442, 444, 24/447, 450, 443, 452; 428/99, 100; 427/421; 156/245

(56) References Cited

U.S. PATENT DOCUMENTS

| 4,617,214 A | * | 10/1986 | Billarant ..................... 428/40.1 |
| 4,784,890 A | * | 11/1988 | Black ........................... 428/100 |
| 5,235,731 A | | 8/1993 | Anzai et al. |
| 5,379,491 A | * | 1/1995 | Solo ........................... 24/306 X |
| 5,665,449 A | * | 9/1997 | Billarant ..................... 428/100 |
| 5,688,576 A | | 11/1997 | Ohno et al. |
| 5,972,465 A | | 10/1999 | Ohno et al. |

FOREIGN PATENT DOCUMENTS

| FR | 2 423 666 | 11/1979 |
| JP | 64-9708 | 1/1989 |
| JP | 3-58109 | 6/1991 |
| JP | 6-99443 | 4/1994 |

* cited by examiner

Primary Examiner—Robert J. Sandy
(74) Attorney, Agent, or Firm—Oblon, Spivak, McClelland, Maier & Neustadt, P.C.

(57) ABSTRACT

The mold-in fastening member, that can be molded into a resin article, of the present invention comprises (a) a substrate having a front surface and a back surface; (b) a plurality of engaging elements provided on the front surface; (c) a plurality of anchoring elements provided on the back surface, the anchoring elements being embedded into the resin article to fix the mold-in fastening member thereto; (d) a ferrite-containing layer formed on the front surface; (e) marginal portions continuously extending along respective lengthwise edges of the substrate; and (f) grooves formed on the substrate, which extend along the respective marginal portions to render the marginal portions easily bending relative to the substrate. The fastening member is easily placed in position on shoulders of a recess formed on a mold and protects the engaging elements from being buried or contaminated by a foaming resin because the ingress of the foaming resin into the recess is effectively prevented due to the close contact of the marginal portions with the shoulders. The fastening member of the present invention is small in size and improve the productivity, safety and working efficiency of the production of molded resin articles having mold-in fastening members.

12 Claims, 2 Drawing Sheets

MOLD-IN FASTENING MEMBER AND PRODUCTION OF MOLDED RESIN ARTICLE HAVING MOLD-IN FASTENING MEMBER

BACKGROUND OF THE INVENTION

1. Field of the Invention

The present invention relates to a mold-in fastening member (hereinafter may be referred to as "fastening member") to be embedded in the surface of a molded resin article such as automotive seat cushions and office chair cushions. The fastening member embedded in the cushion is useful to manufacture automotive seats or office chairs by fixing an upholstery material such as cloth to the cushion.

2. Description of Prior Arts

An automotive seat or office chair seat is generally produced by covering the surface of a cushion made of foamed polyurethane or the like with a seat cover (upholstery material). In the conventional production, a so-called Hogring method has been employed, in which a cushion having molded-in wires is produced by embedding wires retained in a recess of a mold into the cushion, and the seat cover is attached to the cushion by means of a large number of metal fixing members which engage the molded-in wires with the seat cover. The procedure of the Hogring method is accomplished by the aid of an electric tool.

A new molding method has recently been proposed for the production of an automotive seat. This method involves the steps of placing fastening members each having a large number of engaging elements on its top surface and a large number of anchoring elements on its back surface, i.e., flat fastener tapes, in the predetermined positions of a mold; injecting a foaming resin into the mold; and expanding the resin such that a portion of the fastener tapes are integrally embedded in the surface of the cushion and the engaging elements are bared on its outer surface (so-called mold-in method). The cushion is finally covered with a seat cover having elements capable of engaging with the engaging elements of the fastener tape.

The above mold-in method needs, during the molding process while maintaining the fastening member retained on the recess of the mold, to prevent the foaming resin (hereinafter may be referred to as "foaming resin composition") from entering into the top side of the fastening tape having the engaging elements through the gap between the fastener tape and the mold recess, since this can cause a problem of burying the engaging elements in the foamed resin.

A conventional method for solving this problem is shown in FIG. 4. The fastening member (A) is made up of a flat fastener tape (E), a steel strip (F) and a cover film (G). The flat fastener tape (E) has a large number of engaging elements (C) and anchoring elements (D) respectively formed on the top and back surfaces of its substrate (B). The steel strip (F) disposed on the engaging elements (C) is magnetically attached to a magnet (J) embedded in the bottom of the mold during the mold-in process. The cover film (G) entirely covers the steel strip (F) and the engaging elements (C) to prevent the foaming resin composition from entering into the side of the fastening member having the engaging elements (C). The periphery of the cover film (G) is integrally bonded to the periphery of the flat fastener tape (E) by adhesives or heat sealing.

The fastening member (A) is fixed in the recess (K) of the mold by the magnetic force exerted on the steel strip (F) by the magnet (J) arranged at the bottom of the recess (K). Subsequently, a foaming resin composition is injected into the mold so as to produce a cushion in which the anchoring elements (D) are embedded. After taking the molded cushion out of the mold, the cover film (G) and the steel strip (F) are removed from the cushion, so that the engaging elements (C) of the flat fastener are bared on the surface of the cushion.

Another fastening member of the mold-in type is disclosed in Japanese Patent Application Laid-Open No. 64-9708/1989. The proposed fastening member is a flat fastener having a groove along its entire periphery. In a bottom portion of a mold, a recess for receiving the flat fastener is provided, around which a ridge or groove is further formed. The flat fastener is fixed to the mold by fitting the fastener groove with the ridge or groove of the mold. It is reported that, the engaging elements of the fastening member are sealed against a foaming resin by the groove formed on the periphery of the flat fastener and the ridge or groove around the recess for receiving the flat fastener.

Still another fastening member of mold-in type is disclosed in Japanese Utility Model Application Laid-Open No. 3-58109/1991. The fastening member is a flat fastener tape having on its entire outer periphery a fitting member having a rectangular section. The fastening member is undesirably large in size due to the additional fitting member. In addition, the fastening member has another disadvantage that the fitting member has to be formed separately from the flat fastener tape and then attached to the periphery of the flat fastener tape. This disadvantage leads to low productivity due to complicated operations therefor.

Further, French Patent Application Laid-Open No. 2423666 discloses a fastening member capable of being fitted to a recessed portion by bending the fastening member in the width direction.

Also, Japanese Patent Application Laid-Open No. 6-99443/1994 discloses a fastening member which prevents a molding resin from reaching the surface of the fastening member having the engaging elements, by press-fitting the periphery of the fastening member against a shoulder of the recessed groove formed on a mold. In an embodied method of press-fitting, this prior art discloses to press-fit the peripheral portion of the flat fastener to the shoulder of the recessed groove of the mold by magnetically attracting an iron powdercontaining layer formed on an entire part or only a peripheral portion of the engaging surface of the fastening member toward magnets disposed on the shoulder of the recessed groove of the mold.

The above Hogring method of attaching the seat cover to the cushion has the disadvantage of requiring a large number of metal fixing members and a great deal of labor. In addition, it poses a problem with safety and health, e.g., due to possible wounds and tenosynovitis which results from using an electric tool for the metal fixing members. Another disadvantage is that the cushion after scrapping cannot be easily recycled because it contains metal parts such as wires and fixing members.

The mold-in fastening member shown in FIG. 4 has the disadvantage that it is necessary to remove the steel strip (F) and the cover film (G) after molding. After removal, they should be disposed as waste. Another disadvantage is that the film (G) has to be completely removed with great care, because even a small piece of film remaining on the engaging elements reduces the engaging force and deteriorates the appearance. The removal of the film is troublesome and the removal of the steel strip (F) may injure the fingers.

The fastening member disclosed in Japanese Patent Application Laid-Open No. 64-9708/1989 has the disadvantage of requiring a complicated structure in both the flat fastener tape and the mold, making the production method complicated. The former has the groove on its periphery, and the latter is provided with a ridge or a groove along the periphery of the recess for receiving the flat fastener tape. In addition, since the fastener has a periphery having no engaging elements, the width of the fastener is inevitably increased. This is undesirable especially in the case of narrow fasteners because the numbers of engaging elements and anchoring elements are correspondingly decreased, thereby reducing the bonding force of the fastening member to the molded article or engaging force with the upholstery material.

The fastening member disclosed in French Patent Application Laid-Open No. 2423666 is superior in sealing between the recess of the mold and the fastening member once the fastening member is completely fitted to the recess of the mold. However, delicate and careful work is required to fit the fastening member to the recess of the mold, resulting in impractically low working efficiency. In addition, when the molded article with the molded-in fastening member is removed from the mold, the fastening member, if too strongly fitted to the recess of the mold, tends to be separated from the molded resin body. This problem is difficult to solve.

In the method disclosed in Japanese Patent Application Laid-Open No. 6-99443/1994, the recess of the mold can be effectively sealed against access of the molding resin only when the periphery of the fastening member and the shoulder around the recess of the mold are flat, because both can be closely contacted with each other. However, it is very difficult in industrial process to form the iron powder-containing layer having uniformly flat surface along the entire periphery of the fastening member of several tens centimeter long. Therefore, it is substantially impossible to attain a sealing sufficient for the practical use.

SUMMARY OF THE INVENTION

In view of the above problems, an object of the present invention is to provide a mold-in fastening member which is kept fixed to the shoulder of the recess formed on a mold during the molding process to thereby completely prevent a foaming resin composition from entering into the side of fastening member having engaging elements. Another object of the present invention is to provide a mold-in fastening member having a small size as well as excellent productivity, safety and working efficiency. Still another object of the present invention is to provide a process for the production of a resin-molded article having the molded-in fastening member on the surface thereof.

Namely, the present invention provides a mold-in fastening member that can be molded into a resin article, comprising (a) a substrate having a front surface and a back surface; (b) a plurality of engaging elements provided on the front surface; (c) a plurality of anchoring elements provided on the back surface, the anchoring elements being embedded into the resin article to fix the mold-in fastening member thereto; (d) a ferrite-containing layer formed on the front surface; (e) marginal portions continuously extending along respective lengthwise edges of the substrate; and (f) grooves formed on the substrate, which extend along the respective marginal portions to render the marginal portions easily bending relative to the substrate. In a preferred embodiment of the mold-in fastening member, the ferrite-containing layer is provided on the front surface within the area of the engaging elements, and not provided on the marginal portions.

The present invention also provides a process for producing a molded resin article having a fastening member, comprising the steps of (a) fitting the fastening member mentioned above to a recess formed on a mold so that the engaging elements are received in the recess and the marginal portions are placed on a shoulder of the recess to keep the grooves inside the shoulder; (b) sealing the front surface in the recess by press-contacting the marginal portions with the shoulder by a magnetic attracting force between the ferrite-containing layer and a magnet disposed at the bottom of the recess; (c) injecting a foaming resin into the mold; and (d) curing the foaming resin, thereby embedding the anchoring elements into the cured foaming resin. In a preferred embodiment of the process, the ferrite-containing layer is provided on the front surface within the area of the engaging elements, and not provided on the marginal portions.

DESCRIPTION OF THE PREFERRED EMBODIMENTS

The present invention will be described by referring to the accompanying drawings.

Figure 1:
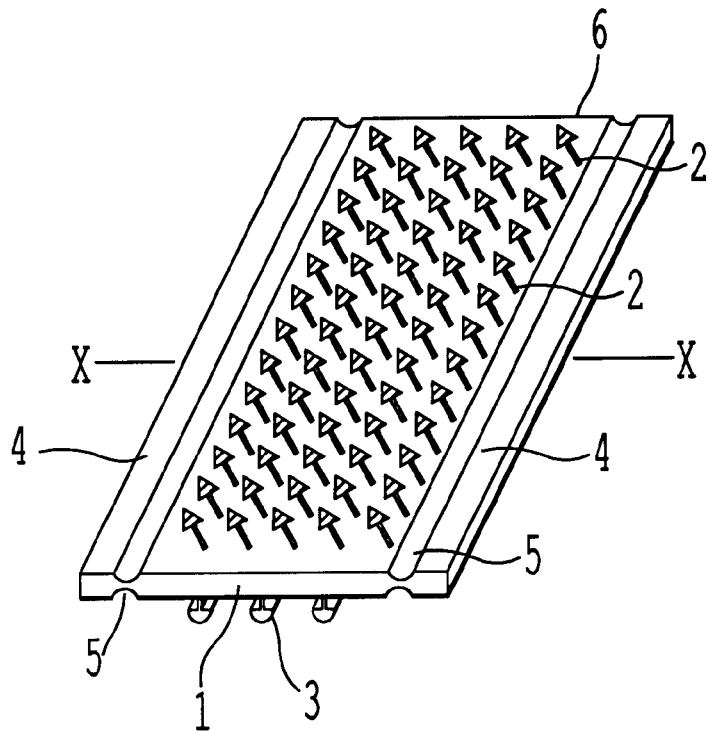
FIG. 1 is a perspective view showing a fastening member according to the present invention.
Figure 2:
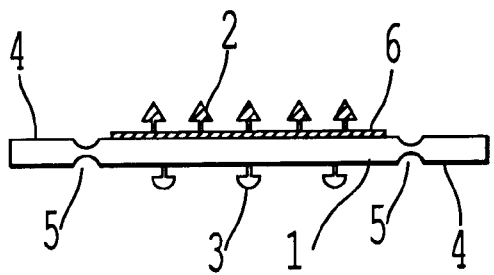
FIG. 2 is a sectional view of the fastening member taken along the line X—X in FIG. 1.

FIG. 1 illustrates a perspective view of a fastening member according to the present invention. FIG. 2 illustrates a sectional view of the fastening member taken along the line X—X of FIG. 1. The fastening member shown in FIGS. 1 and 2 comprises a substrate (1) having a large number of engaging elements (2) on the front surface and at least one continuously extending anchoring elements (3) on the back surface. The front surface and the back surface may be hereinafter referred to as "engaging surface" and "anchoring surface", respectively. The anchoring elements are to be embedded in the molded article of a foaming resin composition and prevent the separation of the fastening member from the foamed molded article. The substrate (1) is further provided with marginal portions (4) for sealing which continuously extend lengthwise from one end to the opposite end along the both side edges, and grooves (5) formed along the respective marginal portions for rendering the marginal portions flexible relative to the substrate. Further, the fastening member is provided on the front surface, preferably at foot portions of the engaging elements, with a ferrite-containing layer (6). FIGS. 1 and 2 show this preferred configuration of the fastening member.

In the present invention, the ferrite-containing layer is formed on the front surface of the substrate. If the ferrite-containing layer is formed on the back surface of the substrate, the foot portions of the anchoring elements are covered with the layer to shorten the effective length of each anchoring element. In addition, the anchoring force of the anchoring elements is detrimentally reduced because a large area of the back surface is covered with the ferrite-containing layer which is less adhesive to resins. Further, in order to ensure a strong attraction of the ferrite-containing layer toward a magnet disposed at the bottom of the mold, it is desirable that the distance between the ferrite-containing layer and the magnet is as close as possible. For this reason, the ferrite-containing layer is preferably formed on the front surface of the substrate, i.e., on the surface from which the engaging elements project. The ferrite-containing layer may be formed on the entire portion of the front surface of the substrate, or a portion excluding the marginal portions, i.e., only a portion from which the engaging elements project. If a flat smooth surface without roughness can be assured, the ferrite-containing layer may be formed on the entire front surface of the substrate. However, since a ferrite-containing resin coating liquid usually has a low fluidity, it is difficult to coat the ferrite-containing resin coating liquid in uniform thickness to form a ferrite-containing layer having a flat smooth surface without roughness. Therefore, the marginal portions are preferred to be provided with no ferrite-containing layer to maintain its flat smooth surfaces without roughness, because the close contact of the flat smooth surfaces of the marginal portions with the shoulder of the recess on the mold is assured to effectively seal the engaging surface against access of the foaming resin composition.

Further, it has been found that it is effective for enhancing the sealing effect of the marginal portions to make the marginal portions easy to bend relative to the substrate, i.e., to make the substrate flexible by providing the grooves between the marginal portions and the boundaries of the area of the engaging elements. The grooves have additional advantage to prevent the ferrite-containing resin coating liquid which is applied on the foot portions of the engaging elements from spreading into the marginal portions. As a result, the flat smooth surfaces of the marginal portions are surely prevented from being damaged by the ferrite-containing resin coating liquid.

The fastening member of the present invention is made of thermoplastic resins such as polyolefin resins, polyester resins and polyamide resins. Of these thermoplastic resins, polyolefin resins such as polypropylene are preferred from the standpoint of moldability. The fastening member of the present invention may be produced by melt-extruding the thermoplastic resin through a nozzle with a slit having a predetermined shape and size to form a tape having continuous ridges on front and back surfaces, cutting the continuous ridges on the front surface at small intervals, and then stretching the tape in the machine direction to form a number of independent engaging elements on the front surface and a number of continuous anchoring elements on the back surface. The thickness of the substrate including the marginal portions is preferably 0.2 to 1.0 mm, more preferably 0.3 to 0.7 mm. The heights of the engaging elements and anchoring elements are not particularly restricted, and usually about 1 to 15 mm, preferably about 1.5 to 6 mm.

The fastening member of the present invention is placed on the shoulder of the recess formed on the mold. In order to prevent the engaging elements of the fastening member from being buried in the resin entering into the recess, it is important to closely contact the fastening member with the shoulder of the recess. The marginal portions and grooves each extending along both the lengthwise edges serve as sealing means for the above purpose. If the complete sealing is obtained only by placing the marginal portions of the fastening member on the shoulder of the recess, no problem arises. However, since the fastening member is relatively rigid and the length thereof ranges from several tens centimeters to one meter or more, it is difficult to establish complete sealing along a overall length thereof.

The inventors have found that the grooves formed along the marginal portions of the substrate are very effective for enhancing the sealing effect of the marginal portions against the shoulder of the recess formed on the mold. More specifically, by forming the grooves between the marginal portions and the boundaries of the area of the engaging elements along the substantially overall length of the substrate, the marginal portions become easy to bend relative to the substrate of the fastening member, i.e., become flexible. When the fastening member is placed on the shoulders of the recess formed on the mold, the fastening member is attracted toward the bottom of the recess by the magnetically attracting force between the ferrite-containing layer provided on the front surface of the substrate and the magnet provided at the bottom of the recess. Due to the flexibility, the marginal portions easily bend and come into close contact with the shoulders of the recess, resulting in improved sealing. In the absence of the grooves formed along the marginal portions, the marginal portions cannot be readily deformed due to the rigidity of the substrate. Therefore, gap is formed between the shoulder of the recess and the marginal portions, thereby failing to establish a complete seal of the engaging surface against the ingress of the molding resin.

The marginal portions are required to have a width enough to be placed on the shoulder of the recess formed on the mold. Since the width of the shoulder is usually about 1 to 2 mm, the width of the marginal portions is preferably about 1 to 5 mm, more preferably 2 to 4 mm. The width of the fastening member is preferred to be not so large as extending beyond the shoulder of the recess formed on the mold, and usually about 10 to 30 mm. The length of the fastening member is generally 100 to 2000 mm. The grooves along marginal portions of the substrate are formed so that they are positioned about 0.5 to 2 mm inside the shoulder of the recess when the fastening member is placed thereon. If the grooves are positioned on the shoulder, the marginal portions do not exhibit a flexibility relative to the substrate, thereby failing to improve the sealing. The width, depth and shape of the grooves are appropriately determined depending on the size, rigidity and the like of the fastening member. Especially, the flexibility of the marginal portions depends upon the depth of the grooves. When the grooves are formed on both the front and back surfaces of the substrate, the total of the front depth and the back depth is preferably 50 to 90% of the thickness of the substrate. When the grooves are formed only on one of the front and back surfaces of the substrate, the depth of the grooves is also preferably 50 to 90% of the thickness of the substrate. Too a large depth may cause cracking of the grooves and breaking of the marginal portions from the fastening member at the grooves, resulting in failure of sealing. The grooves may be formed on one or both of the front and back surfaces of the substrate.

The marginal portions of the fastening member according to the present invention have the above sealing function. In addition, since a small gap is formed between the edge of the marginal portions and the top surface of the shoulder of the recess formed on the mold, the foaming resin composition is allowed to enter into the gap and a part of the edge is buried in the foaming resin composition. This strengthens the bonding between the fastening member and the molded resin body.

The marginal portions having such a sealing function and the grooves are formed simultaneously with the substrate by melt-extruding the thermoplastic resin through a nozzle with a slit having a corresponding shape. Alternatively, the grooves may be formed on the substrate of the formed fastening member by pressing a heated metal on the positions near the lengthwise edges of the substrate or by grooving the surface of the substrate, leaving the marginal portions outside the grooves.

The ferrite-containing layer may be formed by applying a liquid composition prepared by mixing commercially available ferrite particles with an adhesive ingredient, e.g. rubber-based adhesive onto the predetermined portions of the surface of the substrate using a sprayer or a nozzle gun. The thickness of the ferrite-containing layer should be adequately controlled so as not to bury the engaging elements. The needle-coating method described below may be suitably employed because it is suitable for forming the ferrite-containing layer mainly in the area of the engaging elements, for preventing the foot portions of the engaging elements from being buried in the ferrite-containing resin, and for preventing the ferrite-containing resin from coating the marginal portions.

More specifically, the ferrite-containing layer is preferably formed by the following needle-coating method. First, ferrite particles having a particle size of 0.5 to 3 $\mu$m are mixed with a resin liquid comprising a binder resin dispersed or dissolved in water or an organic medium to prepare a ferrite-containing resin liquid comprising 5 to 20 weight % of the binder resin, 20 to 70 weight % of the aforementioned ferrite particles and the balance of water or the organic medium. The binder resin can be selected from a wide variety of polymers which are adhesive to the substrate of the fastening member. Examples of the binder resin include chlorinated polypropylene and acrylic polymers which are highly adhesive to polypropylene substrate. The ferrite-containing resin solution is fed to a tube-type metering pump and applied to the surface of the substrate between the arrays of the engaging elements through a needle nozzle. The application amount is controlled so as to prevent the engaging elements from being buried and produce a necessary level of magnetic attraction force. Streaks of the ferrite-containing resin liquid from the nozzle of the needle form a wet ferrite-containing layer between the arrays of the engaging elements. Then, the wet ferrite-containing layer is dried by a hot-air dryer or the like, thereby forming a ferrite-containing layer preferably having a thickness of 0.2 to 2 mm. The number of the needles used are optionally selected depending upon the number of the arrays of the engaging elements. The inner diameter of the needle is preferably 0.5 to 2.0 mm.

Thus, by replacing the metal strip used in the prior art with the ferrite-containing layer of the present invention, the productivity of the fastening member is improved and the production costs is reduced. With the use of the fastening member of the present invention, the number of the steps for the production of the molded articles having molded-in fastening members is reduced and working efficiency is improved. Also, by forming the ferrite-containing layer on the engaging surface, i.e., the surface closer to the magnet disposed in the mold, a strong magnetic attraction force is obtained.

Figure 3:
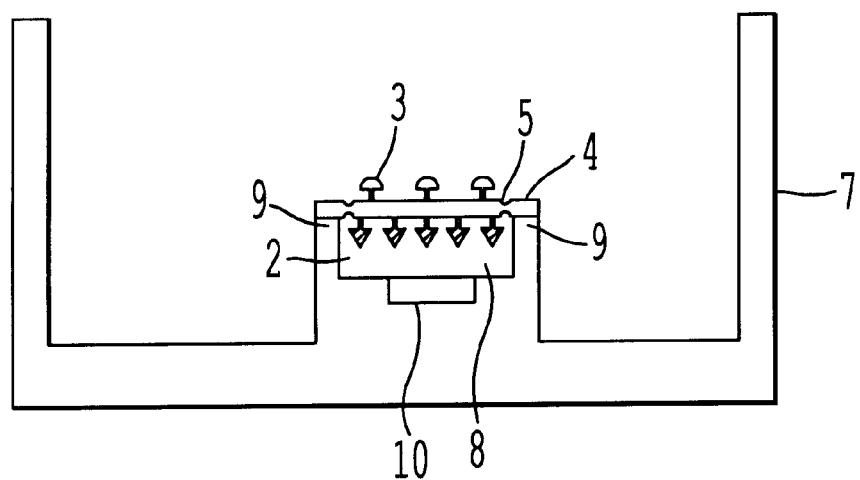
FIG. 3 is a schematic sectional view showing the fastening member fitted to the recess of the mold.
Figure 4:
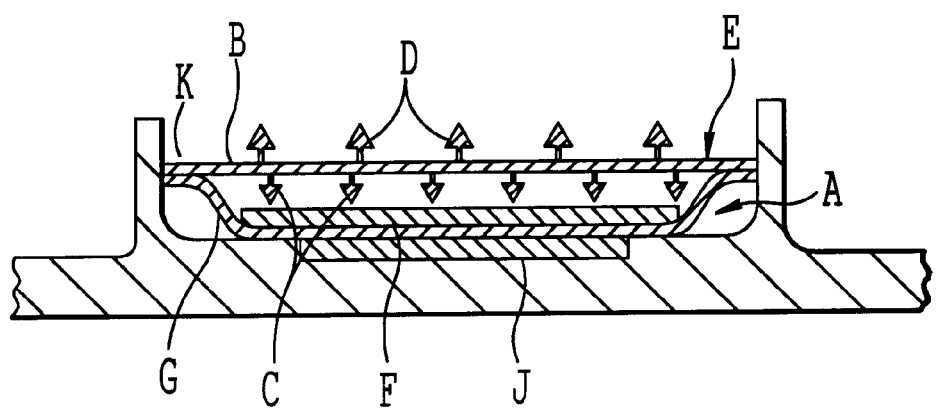
FIG. 4 is a sectional view showing a conventional fastening member.

FIG. 3 is a schematic sectional view showing the fastening member of FIG. 1 fitted to a recess of a supporting means for receiving the fastening member. The fastening member is fitted to a recess (8) of the supporting means disposed at the bottom of the cavity of a mold (7) such that the engaging elements (2) are received in the recess (8) and the marginal portions (4) are brought into contact with the shoulder (9) of the recess (8). The fastening member is downwardly attracted by the magnetically attracting force between the ferrite-containing layer and a magnet (10) disposed at the bottom of the recess (8). As the fastening member moves down, the marginal portions (4) bend at the grooves (5) to firmly contact the shoulder (9), thereby completing the sealing. With such a complete sealing, the foaming resin composition injected into the mold is prevented from entering into the recess (8), thereby inhibiting the engaging elements (2) from being buried in the resin.

When a cushion for automotive seat is intended, the recess (8) are preferably configured, as seen from FIG. 3, so that the bottom surface thereof is positioned higher than the bottom surface of the mold cavity. With such a configuration, the fastening member sinks into the cushion to provide a comfortable seat because a person sitting thereon is kept away from contacting the fastening member.

When the viscosity of the foaming resin composition is high, the sealing at the lengthwise ends of the fastening member is not particularly required, because the amount of the resin entering into the recess through the gap at the lengthwise ends is very small. When the viscosity is as low as permitting the foaming resin composition to enter into the recess, a sealing means made of fiber mass or resin pieces can be provided at the lengthwise ends of the fastening member to prevent the resin from entering into the recess through the gap. Alternatively, a weir-like sealing means may be provided at the lengthwise ends of the recess of the supporting means so as to come into contact with the lengthwise ends of the fastening member to prevent the resin from reaching the engaging surface.

The preferred embodiment of the present invention will be described in more detail by referring to the accompanying drawings.

EXAMPLE

FIG. 3 illustrates the production of an automobile seat cushion using the fastening member of the present invention. As shown in FIG. 3, a molding resin such as polyurethane was injected into the mold cavity and then expanded by foaming while maintaining the fastening member being fitted to the recess of the supporting means. After curing the resin, the molded cushion was removed from the mold. The obtained cushion was provided on the surface thereof with the fastening member of the present invention which was integrally embedded therein. In the molded cushion, the engaging elements of the fastening member were surely laid bare on the surface thereof without being covered with the foamed resin. Further, the fastening member was firmly fixed to the molded cushion, because the anchoring elements and a part of the marginal portions were embedded in the molded cushion.

In this Example, the marginal portions had a thickness of 0.5 mm and a width of 3 mm. The grooves between the substrate and the marginal portions had a depth corresponding to 40% of the thickness of the marginal portions and a width of 0.2 mm. The grooves were formed on both the front and back surfaces of the substrate. The substrate of the fastening member had a width of 11 mm and a thickness of 0.5 mm, and on the front surface thereof, the engaging elements having a height of 2.5 mm and a lengthwise width of 0.2 mm projected uprightly from the substrate and were arranged in five rows along the lengthwise direction. The density of the engaging elements was 120/row per 10 cm along the lengthwise direction. The width of the head portion of the engaging elements tapers downwardly along the width direction of the substrate to form a mushroom-like shape. The mushroom-like head strengthens the bonding between the fastening member and the seat cover.

On the back surface of the substrate, the anchoring elements having a height of 2 mm were arranged in three rows along the lengthwise direction of the substrate. Like the engaging elements, the anchoring elements had mushroom-like head portions. However, unlike the engaging elements, the anchoring elements extend continuously along the lengthwise direction of the substrate.

The ferrite-containing resin layer was formed only on the front surface within the area of the engaging elements, and not formed in the marginal portions. The ferrite-containing resin layer contained 90% by weight of ferrite particles having an average particle size of 1.8 $\mu$m, and had an average thickness of 0.2 mm.

The fastening member including the marginal portions was integrally molded from polypropylene. The rubber material for the ferrite-containing resin layer was an acrylic resin. The ferrite-containing rubber layer was formed by the needle coating method mentioned above using a needle having an inner diameter of 1.0 mm. At the bottom of the mold cavity, a supporting means having a recess for receiving the fastening member was disposed. In order to prevent the foaming resin composition from entering into the recess from the lengthwise ends of the substrate, the inner surface of the recessed supporting means was provided with a weir-like sealing means to seal the lengthwise ends of the substrate.

The cushion thus produced by the mold-in method was covered with a seat cover by engaging the exposed engaging elements on the surface of the cushion with the cooperating engaging elements such as looped or raised fibers on the rear surface of the seat cover. The seat cover firmly contacted the outer contour of the cushion to secure the covering of the cushion. When the fastening members of the present invention are disposed in narrow and deep grooves on the surface of the cushion, the seat cover can be attached more firmly to the cushion to produce excellent touch because the seat cover is drawn into the grooves. In addition, the comfortable feeling for sitting is not deteriorated because a person sitting on the seat is kept away from contacting the fastening member.

In the above Example, no ferrite-containing layer was formed on the marginal potions. A fastening member having the ferrite-containing layer on the surfaces of both the substrate and the marginal portions was prepared by the needle-coating method. As a result of the production of the cushions using the resultant fastening members, four per 100 cushions were defective cushions having the engaging surface covered with the resin due to incomplete sealing. The seat cover was unable to be strongly attached to the surface of the defective cushions due to a low engaging force between the defective engaging elements and the seat cover. When no ferrite-containing layer was formed on the marginal portions, the defective cushion was produced in a proportion of only one or less per 100 cushions.

Although only the application to the automotive seat cushion is described above, the fastening member of the present invention is not limited in its application thereto and equally applicable to other molded articles.

Comparative Example

The same procedure as in Example was repeated except that no grooves were formed between the area of the engaging elements and the marginal portions. The resultant fastening member was insufficient in flexibility of the marginal portions, and as a result thereof, some parts of the marginal portions were not closely contacted the shoulder of the recess formed on the mold to make the sealing incomplete. Therefore, the defective cushions were produced in a proportion of 9 per 100 cushions. The seat cover was unable to be strongly attached to the surface of the defective cushions due to a low engaging force between the defective engaging elements and the seat cover.

As described above, the fastening member of the present invention is retained on the recess formed on the mold easily and tightly, and excellent in sealing effect in the width direction. Therefore, the foaming resin composition is surely prevented from entering into the recess to reach the engaging surface. The cushions produced using the fastening member of the present invention is closely and firmly covered by a seat cover because the seat cover is drawn to the fastening members, this making the seat comfortable in touch. The use of the fastening member of the present invention improves the productivity, safety and working efficiency of the production of the automotive seat, etc.

What is claimed is:

1. A mold-in fastening member that can be molded into a resin article, which comprises:
    a substrate having a front surface and a back surface;
    a plurality of engaging elements provided on the front surface;
    a plurality of anchoring elements provided on the back surface, the anchoring elements being embedded into the resin article to fix the mold-in fastening member thereto;
    a ferrite-containing layer formed on the front surface;
    marginal portions continuously extending along respective lengthwise edges of the substrate; and
    grooves formed on the substrate, which extend along the respective marginal portions to render the marginal portions easily bending relative to the substrate.

2. The mold-in fastening member according to claim 1, wherein the ferrite-containing layer is formed on the front surface within an area of the engaging elements, and not formed on the marginal portions.

3. The mold-in fastening member according to claim 1, wherein the ferrite-containing layer comprises ferrite particles and a binder resin.

4. The mold-in fastening member according to claim 1, wherein the ferrite-containing layer has a thickness of 0.2 to 2.0 mm.

5. The mold-in fastening member according to claim 1, wherein each of the marginal portions has a width of about 1 to 5 mm.

6. The mold-in fastening member according to claim 1, wherein the grooves are formed on one of the front surface and the back surface.

7. The mold-in fastening member according to claim 6, wherein a depth of the grooves is 50 to 90% of a thickness of the substrate.

8. The mold-in fastening member according to claim 1, wherein the grooves are formed on both the front surface and the back surface.

9. The mold-in fastening member according to claim 8, wherein a total of depths of the grooves on the front surface and the back surface is 50 to 90% of a thickness of the substrate.

10. The mold-in fastening member according to claim 1, wherein the anchoring elements continuously extend along the lengthwise direction of the substrate.

11. A process for producing a mold-in fastening member that can be molded into a resin article, which comprises the steps of:

preparing a fastening tape comprising a substrate having a front surface and a back surface, a plurality of engaging elements provided on the front surface, a plurality of anchoring elements provided on the back surface which are to be embedded into the resin article to fix the mold-in fastening member thereto, marginal portions continuously extending along respective lengthwise edges of the substrate, and grooves which extend along the respective marginal portions to render the marginal portions easily bending relative to the substrate;

applying a ferrite-containing resin liquid to the front surface within an area of the engaging elements by a needle-coating method; and drying the applied ferrite-containing resin liquid.

12. A process for producing a molded resin article having a fastening member comprising a substrate having a front surface and a back surface, a plurality of engaging elements provided on the front surface, a plurality of anchoring elements provided on the back surface, a ferrite-containing layer formed on the front surface, marginal portions continuously extending along respective lengthwise edges of the substrate and grooves formed on the substrate which extend along the respective marginal portions to render the marginal portions easily bending relative to the substrate, the process comprising the steps of:

fitting the fastening member to a recess formed on a mold so that the engaging elements are received in the recess and the marginal portions are placed on shoulders of the recess to keep the grooves inside the shoulders;

sealing the front surface in the recess by press-contacting the marginal portions with the shoulder by a magnetic attracting force between the ferrite-containing layer and a magnet disposed at the bottom of the recess;

injecting a foaming resin into the mold; and curing the foaming resin, thereby embedding the anchoring elements into the cured foaming resin.

* * * * *